United States Patent

Pierrot et al.

[11] Patent Number: 5,852,854
[45] Date of Patent: Dec. 29, 1998

[54] PLUG FOR CLOSING ANY OPENING AND METHOD OF MANUFACTURING THIS PLUG

[75] Inventors: Jean-Michael Pierrot, Grosley Sur Risle; Jean-Pierre Leon, Houilles; Philippe Vigouroux, Conflans Sainte Honorine, all of France

[73] Assignee: Rapid S.A., Paris, France

[21] Appl. No.: 618,561

[22] Filed: Mar. 20, 1996

[30] Foreign Application Priority Data

Mar. 21, 1995 [FR] France ................... 95 03284

[51] Int. Cl.$^6$ ................... B65D 39/12
[52] U.S. Cl. ................... 24/297; 24/625; 264/267; 264/255; 264/46.6; 277/637; 277/943; 428/500; 428/520; 428/522; 428/66.3; 428/66.4; 428/304.4
[58] Field of Search ................... 428/515, 516, 428/304.4, 305.5, 63, 66.3, 66.4, 500, 514, 520, 522; 264/41, 45.6, 46.9, 51, 240, 255, 267, 268, 46.6; 277/943, 637; 24/297, 625

[56] References Cited

U.S. PATENT DOCUMENTS

| | | | |
|---|---|---|---|
| 3,504,817 | 4/1970 | Heider | 215/38 |
| 4,198,369 | 4/1980 | Yoshikawa et al. | 264/268 |
| 4,988,467 | 1/1991 | Holdsworth et al. | 264/46 |
| 5,225,125 | 7/1993 | Wildfeuer et al. | 264/46.6 |
| 5,230,583 | 7/1993 | Johnson | 404/25 |

FOREIGN PATENT DOCUMENTS

| | | |
|---|---|---|
| 51523 | 5/1982 | European Pat. Off. |
| 2105169 | 4/1972 | France . |
| 2250684 | 6/1975 | France . |
| 88 03115 | 5/1988 | WIPO . |

OTHER PUBLICATIONS

Patent Abstracts of Japan, vol. 15, No. 328 (C–0860) Aug. 1991.
Patent Abstracts of Japan, vol. 11, No. 159 (C–423) May 1987.
Patent Abstracts of Japan, vol. 17, No. 469 (M–1469) Aug. 1993.
Patent Abstracts of Japan, vol. 5, No. 4 (C–038) Jan. 13, 1981.
Patent Abstracts of Japan, vol. 17, No. 212 (M–1402) Apr. 26, 1993.

Primary Examiner—Paul Thibodeau
Assistant Examiner—D. Lawrence Tarazano
Attorney, Agent, or Firm—Leydig, Voit & Mayer

[57] ABSTRACT

The invention relates to an obturating stopper plug as well as to a method of manufacture of this stopper plug.

The stopper plug for obturating any opening (2) and comprising a bead of heat-fusible adhesive (7) deposited upon the said stopper plug is characterized in that the bead of heat-fusible adhesive (7) comprises:

(a) an adhesive mixture,
(b) a cross-linking agent,
(c) an expansion agent decomposing at a temperature close to the cross-linking temperature of the adhesive mixture (a),
(d) additives for working purposes.

The invention is applicable to the obturation, for example, of an opening in a plate to be passed into a drying oven for paint.

13 Claims, 2 Drawing Sheets

PLUG FOR CLOSING ANY OPENING AND METHOD OF MANUFACTURING THIS PLUG

BACKGROUND OF THE INVENTION

1. Field of the Invention

The present invention relates essentially to a stopper plug for closing any aperture.

It is also directed to possible a method of manufacture of such a plug.

2. Description of Related Art

There has already been proposed stopper plugs for obturating openings on any element whatsoever, such as a metal plate.

These stopper plugs may comprise a bead or line of heat-fusible adhesive. Thus once the stopper plug is in position on the opening and when the plate provided with such a stopper plug is brought to a certain temperature beyond the melting temperature of the bead or line of adhesive, there will occur an obturation of the opening through adhesively bonding of the stopper plug upon the latter.

This method however exhibits inconveniences when the plate exhibits flatness defects and, as a result the obturation thus made is not fluid-tight.

Thus the object of the present invention is to remedy in particular this drawback by providing a stopper plug for sealing purposes which will be quite fluid-tight under any circumstances and this irrespective of the shape of the stopper plug or of the shape of the element to be provided with such a stopper plug.

SUMMARY OF THE INVENTION

For that purpose the subject of the invention is a stopper plug for closing any opening and comprising a bead or line of heat-fusible adhesive deposited upon the stopper plug, characterized in that the bead of heat-fusible adhesive comprises:

(a) an adhesive mixture, (b) a cross-linking agent, (c) an expansion agent decomposing at a temperature close to the cross-linking temperature of the adhesive mixture (a) and (d) additives for working purposes.

According to an aspect of the invention the aforesaid expansion agent is selected from the group consisting of azobisisobutyronitrile, azodicarbonamide, hydrazine and a hydrazine derivative.

As to the adhesive mixture, it is selected from the group consisting of a terpolymer of ethylene/acrylic ester/maleic anhydride, a maleic anhydride-grafted copolymer of ethylene/acrylic ester and their mixtures.

In this case the cross-linking agent is a peroxide.

According to a characterizing feature of the stopper plug of the invention, the adhesive mixture contains between 5% and 40% by weight of acrylic ester with respect to the total weight of the terpolymer or of the graft copolymer, between 0.3% and 5% by weight of maleic anhydride with respect to the total weight of the terpolymer or of the graft copolymer, the remainder being ethylene.

One should more particularly prefer a terpolymer or a maleic anhydride-grafted copolymer which has a melt index lying between 2 and 400 g/10 minutes.

According to a preferred embodiment of the invention, the expansion agent is azodicarbonamide.

More particularly the expansion agent constitutes between 0.1% and 30% by weight of the total weight of the bead of heat-fusible adhesive.

Preferably the expansion agent constitutes from 1.5% to 5% by weight of the total weight of the bead of heat-fusible adhesive.

According to an embodiment of the invention, the stopper plug is characterized in that it comprises a surface with dimensions greater than those of the opening to be closed as well as a means for hooking into the opening, the bead of heat-fusible adhesive with the expansion agent incorporated therein being disposed upon the surface and/or upon the hooking means.

According to another embodiment, the stopper plug consists fully of the composition defined hereinabove for the heat-fusible adhesive constituting the bead of adhesive.

The invention is also directed to a method of manufacturing a stopper plug meeting the characterizing features referred to hereinabove, this method consisting in moulding in the same mould by two successive injections the stopper plug and then the bead of adhesive which is moulded through injection at a temperature lower than that causing the expansion of the swelling agent.

The obturating stopper plug according to this invention could of course be made otherwise than through a bi-injection without departing from the scope of the invention.

BRIEF DESCRIPTION OF THE DRAWINGS

The invention will be better understood and further objects, characterizing features, details and advantages thereof will appear better as the following explanatory description proceeds with reference to the attached diagrammatic drawings given by way of example only and illustrating a presently preferred specific embodiment of the invention and in which.

DESCRIPTION OF THE PREFERRED EMBODIMENTS

Figure 1:
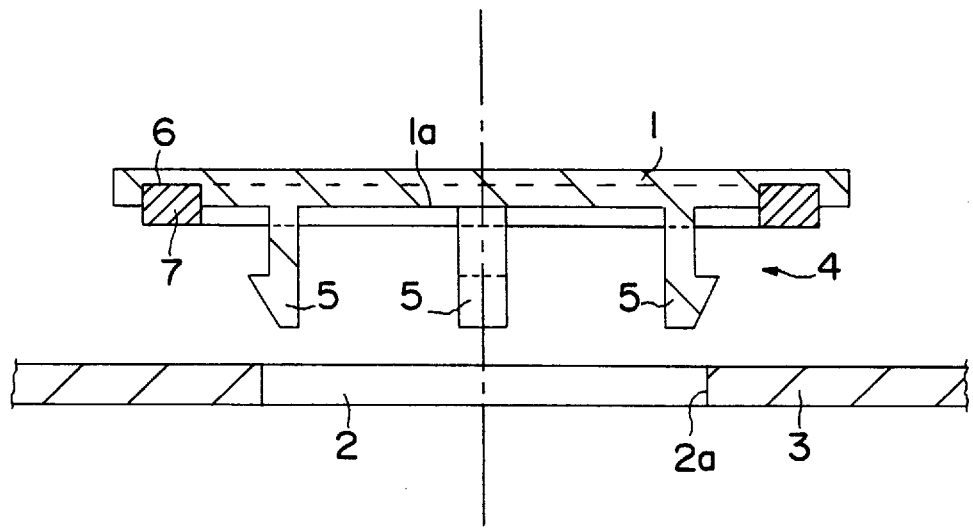
FIG. 1 is an elevational view in section of a stopper plug according to this invention before being mounted upon the element which should receive it.
Figure 2:
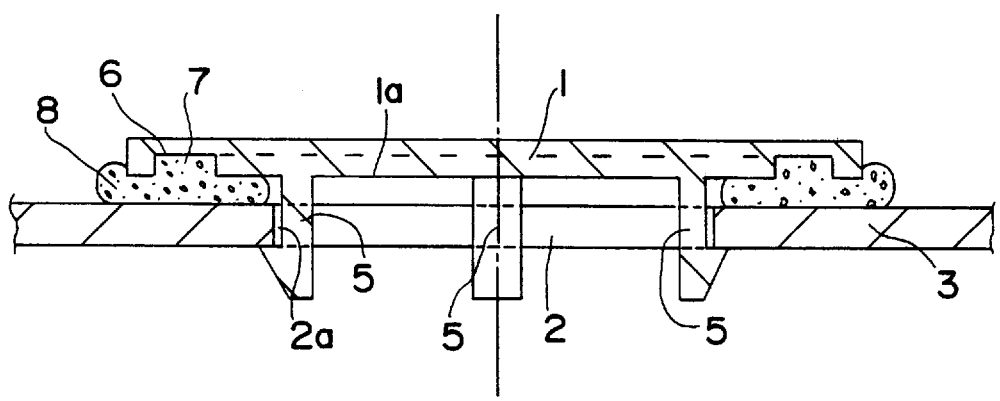
FIG. 2 is a view similar to the foregoing one but showing the stopper plug in the mounted position upon the element and after fusion and expansion of the bead of adhesive associated with the stopper plug.

According to the exemplary embodiment shown in FIGS. 1 and 2, a stopper plug according to the principles of the invention essentially comprises, for example, an annular surface 1 with dimensions greater than those of an opening 2, formed in an element, such as a plate 3, which should receive the stopper plug. The latter further comprises a means 4 for hooking the stopper plug into the opening 2, this means, according to the exemplary embodiment shown, consisting of lugs 5 for hooking the stopper plug upon the edge 2a of the opening 2.

In the lower face or side 1a of the surface 1 is formed an annular groove in which is accommodated a bead of heat-fusible adhesive 7.

According to the invention, the bead of adhesive comprises:

(a) an adhesive mixture,
(b) a cross-linking agent,
(c) an expansion agent, and
(d) additives for working purposes.

The expansion agent may be an expansion agent which breaks down at a temperature close to or lower than the cross-linking temperature of the adhesive mixture (a), the expansion of the adhesive bead occurring then either at the same time as the cross-linking of the adhesive mixture (a) or afterwards.

According to the invention, it is preferred that the expansion agent decompose at a temperature close to the cross-linking temperature of the adhesive mixture (a), thereby advantageously permitting at the same temperature sticking of the adhesive mixture upon the substrate, preventing run-outs and creeping by cross-linking and providing fluid-tightness by obturation of the opening due to the swelling of the adhesive.

Thus, according to the invention, through heat-decomposition of the expansion agent, the adhesive resin forms a foam which sticks to the support without any supply of additional adhesive.

The expansion agent preferred in the invention is selected from the group consisting of azobisisobutyronitrile, azodicarbonamide, hydrazine or a hydrazine derivative. The most preferred expansion agent however is azodicarbonamide.

The azodicarbonamide is advantageously used with decomposition auxiliaries or aids such as zinc oxide.

The expansion agent content should be chosen in accordance with the density of the foam which is desired to be obtained after decomposition of the expansion agent for the adhesive mixture.

Generally the amount of expansion agent should constitute from 0.1% to 30% by weight of the total weight of the bead of adhesive (7).

The best results obtained with the invention have however been provided with an expansion percentage lying between 1.5% and 5% by weight of the total weight of the bead of adhesive (7).

As to the adhesive mixture according to the invention, it is selected from the group consisting of a terpolymer of ethylene/acrylic ester, maleic anhydride and a maleic anhydride-grafted copolymer of ethylene/acrylic ester and their mixtures.

It is the maleic anhydride which imparts the adhesive bonding properties to the adhesive mixture.

The maleic anhydride content of the terpolymer or of the copolymer grafted with maleic anhydride should vary between 0.3% and 5% by weight of the total weight of the adhesive mixture.

Below 0.3% by weight of maleic anhydride, the adhesive bonding is no longer sufficient.

On the contrary beyond 5% by weight of maleic anhydride, the resistance to moisture decreases very strongly.

The acrylic ester comonomer-content of the terpolymer or of the maleic anhydride-grafted copolymer constitutes the adhesive mixture of the invention lies between 5% by weight and 40% by weight of the total weight of the adhesive mixture.

Below 5% by weight of acrylic ester, the terpolymer or the graft copolymer of the invention has the behaviour of the polyethylene. The advantage of the introduction of an acrylic ester is therefore not achieved.

Beyond 40% of acrylic ester, the terpolymer or the graft copolymer of the invention is too flexible.

In both cases, the positive effect of the combination of ethylene and of acrylic ester is not achieved.

Many acrylic esters may be used to carry out the invention but those preferred are methyl acrylate, ethyl acrylate, n-butyl acrylate, isobutyl acrylate and 2-ethyl hexyl acrylate.

Among the latter, n-butyl acrylate has proved to be particularly adapted.

The remainder of the adhesive mixture consists of course of ethylene.

The ethylenic terpolymer or maleic anhydride-grafted copolymer of the invention exhibits flexibility and fluidity characteristic features allowing a yielding foam and a mouldable and extrudable fluid compound to be obtained.

Still according to the invention, the melt index of this ethylenic terpolymer or maleic anhydride-grafted copolymer forming the adhesive mixture (a) has a melt index lying between 2 and 400 g/10 mn inclusive.

It is indeed necessary to substantially increase the rate of cross-linking to achieve a good temperature behaviour of the bead of adhesive (7), which is attended by a loss of flexibility and the formation of a not very homogeneous foam when the melt index of the ethylenic terpolymer or maleic anhydride-grafted copolymer of the invention is above 400.

Also when the melt index of the adhesive mixture (a) is below 2, there may be a self-heating up and in extreme cases decomposition of the expansion agent.

The formulation of the bead of heat-fusible adhesive (7) stated hereinabove allows a moulding of the bead at a temperature low enough to avoid the onset of the expansion, the azodicarbonamide breaking down and therefore causing the expansion at a temperature lying between 120° C. and 200° C.

It should be pointed out that the maleic anhydride may be replaced by a compound containing an epoxy functional group.

It should also be noted that the acrylic ester could also be substituted for by vinyl acetate.

It is also possible to incorporate into the bead of adhesive 7 anti-U.V. agents, such as phenyl salicylate, and/or fire-proofing agents, such as hydrated alumina and tetrabromobenzene.

Typically as it will be seen in the examples, the bead of heat-fusible adhesive 7 of the invention comprises stearic acid as a compounding and injection aid.

Referring now to FIG. 2, it is seen that the bead of adhesive 7 has undergone an expansion visible at 8 after heating up to a temperature sufficient to permit the expansion which is likely as seen on the figure to closely fill in all the gaps or interstices between the plate 3 and the surface 1 of the stopper plug. This adequate temperature could be, for example, that of a drying-oven for paint into which the plate 3 is passed.

In this respect it should be pointed out that if azodicarbonamide is used as a swelling or expansion agent in the bead of adhesive 7, an expansion of the bead of adhesive will be achieved at temperatures lying between about 120° C. and 200° C. Preferably the expansion should be carried out at a temperature lying between 120° C. and 160° C., this temperature being adequate to cause the concomitant cross-linking of the adhesive mixture.

The obturating stopper plug which has just been described could for instance be made through injection moulding in the following manner. It should be made through bi-injection of material, i.e. more specifically through injection moulding in a mold of the stopper plug proper and then through moulding of the bead of adhesive upon the underside or bottom face 1a of the surface 1 and within the groove 6 at a temperature which should be below that causing the expansion of the expansion agent incorporated into the bead of adhesive 7, i.e. at a temperature lying between 80° C. and 140° C., preferably between 80° C. and 120° C. in the case of the composition for the adhesive mixture (a) described hereinabove.

The melting temperature of the aforesaid terpolymer as well as of the aforesaid maleic anhydride-grafted copolymer forming the adhesive mixture (a) indeed is of about 70° C. to 90° C.

In the case where an expansion agent with a temperature below the cross-linking temperature of the adhesive mixture is used, there should be carried out at first the expansion through decomposition of the expansion agent and then at a higher temperature the cross-linking of the adhesive mixture (a).

It is therefore understood from the previous explanations and as well seen in FIG. 2 that owing to the arrangements according to this invention, a perfect fluid-tightness between the stopper plug and opening will be obtained without the bead of adhesive 7 imparting an unaesthetic appearance to the assembly.

Figure 3:
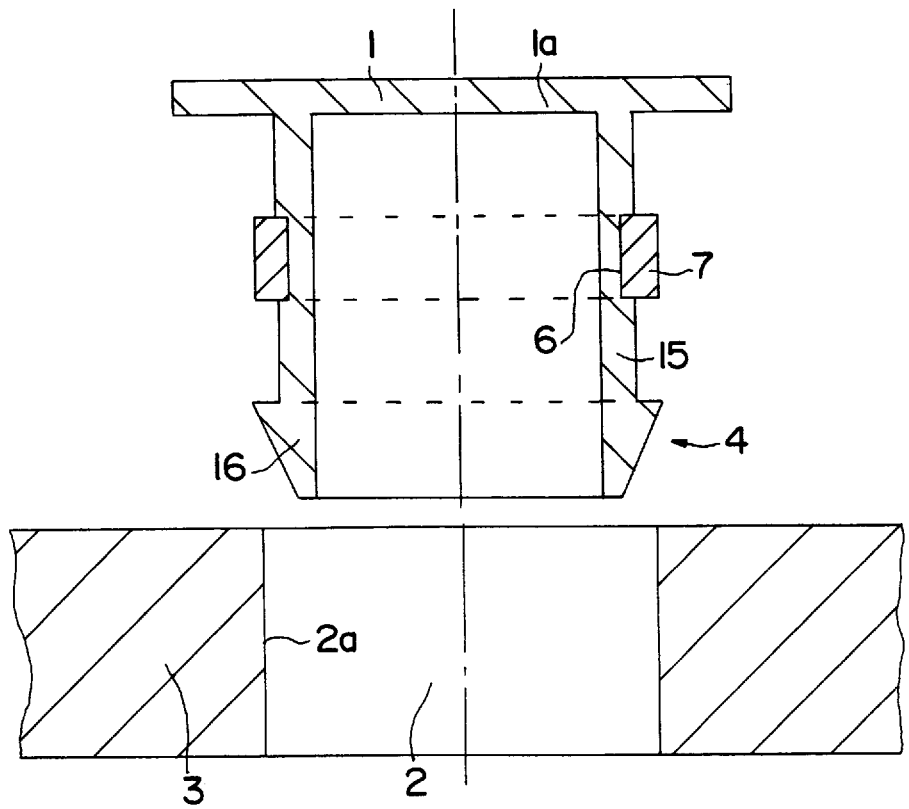
FIG. 3 is a view similar to FIG. 1 but showing another arrangement of the bead of adhesive upon the stopper plug.
Figure 4:
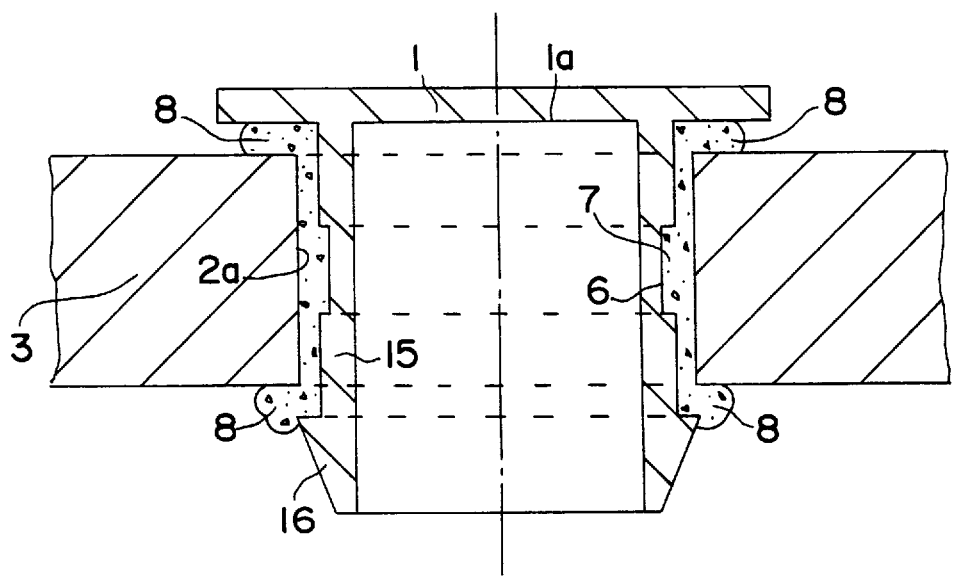
FIG. 4 is an elevational view in section of the stopper plug of FIG. 3 in the mounted position in the opening of a plate, for example, and after fusion and expansion of the bead of adhesive.

Reference should now be had to the embodiment illustrated by FIGS. 3 and 4 wherein the same reference characters have been used to designate the common elements.

Here the groove 6 receiving the bead of adhesive 7 comprising the expansion agent is formed in an annular element 15 comprising a hooking end 16.

And as well seen in FIG. 4, the bead of adhesive 7 expands owing to the incorporated expansion agent as well between the annular hooking element 15 and the edge 2a of the opening 2 as between the plate 3 and the underside 1a of the surface 5 which here comprises no bead of adhesive.

This being so, there could also be provided in the case of the embodiment of FIGS. 3 and 4 a bead of adhesive deposited upon or associated with the surface 1 of the obturating stopper plug although this has not been shown.

Examples of chemical formulation of the joint of heat-fusible adhesive 7 according to the invention will now be described. These examples are given by way of illustration only and should in no case be considered as limiting the invention.

In these examples, all the percentages are by weight except when otherwise specified.

EXAMPLE 1

The formulation of the joint of heat-fusible adhesive in this invention is the following:

| | |
|---|---|
| Terpolymer of ethylene/20% ethyl acrylate/3% maleic anhydride | 50% by weight |
| Terpolymer of ethylene/20% ethyl acrylate/3% maleic anhydride | 41.9% by weight |
| Bis (2-tert-butylperoxy-isopropyl) benzene | 3.6% by weight |
| Azodicarbonamide | 2% by weight |
| ZnO | 2% by weight |
| Stearic acid | 0.5% by weight |

The first terpolymer has a melt index of 20 g/10 mn and a melting point of 80° C.

The second terpolymer has a melt index of 70 g/10 mn and a melting point of 76° C.

Their combination allows a good cross-linking/flexibility compromise and fluidity for the injection of the adhesive formulation to be obtained.

An expansion and a simultaneous cross-linking of this joint of adhesive has been carried out. A foam with a density of about 0.5 has been obtained.

The fluidity of this formulation was suitable for the manufacture of an obturator in the invention by bi-injection as described hereinabove.

EXAMPLE 2

The following formulation has been used in this example:

| | |
|---|---|
| Terpolymer of ethylene/20% ethyl acrylate/3% maleic anhydride | 50% by weight |
| Terpolymer of ethylene/20% ethyl acrylate/3% maleic anhydride | 40.4% by weight |
| Bis (2-tert-butylperoxy-isopropyl) benzene | 3.6% by weight |
| Azodicarbonamide | 3.5% by weight |
| ZnO | 2% by weight |
| Stearic acid | 0.5% by weight |

As in example 1, the first terpolymer has a melt index of 20 g/10 mn and a melting point of 80° C. and the second terpolymer has a melt index of 70 g/10 mn and a melting point of 76° C.

The formulation has a fluidity suitable for the manufacture of a stopper plug according to the invention through bi-injection as described hereinabove.

The expansion has been carried out in a manner concomitant with the cross-linking of the adhesive mixture of this formulation.

The foam obtained after this expansion-cross-linking has a density of about 0.20.

In both foregoing examples, there has been provided according to the invention an obturating stopper plug providing under any circumstances and irrespective of the flatness defects of the plate 3 and of the obturating stopper plug, a perfect fluid-tightness between the stopper plug and the said plate owing to the use of the joint of heat-fusible adhesive 7 comprising the adhesive mixture and an incorporated expansion agent.

It is quite possible without departing from the scope of the invention to provide for the bead of adhesive with its incorporated expansion agent, a place onto the stopper plug other than that shown on the figures, this depending in particular on the peculiar hooking means used for the stopper plug.

Likewise the formulation which has been described previously for use in the joint of adhesive (7) could be used to make the obturating stopper plug itself.

Thus a stopper plug of the invention could consist only of a composition comprising:

(a) an adhesive mixture, (b) a cross-linking agent, (c) an expansion agent decomposing at a temperature close to the cross-linking temperature of the adhesive mixture (a), (d) additives for working purposes.

Of course as previously stated, the expansion agent is preferably selected from the group consisting of azobisisobutyronitrile, azodicarbonamide, hydrazine and a hydrazine derivative.

As to the adhesive mixture, it is also in this case preferably selected from the group consisting a terpolymer of ethylene/acrylic ester/maleic anhydride, a maleic anhydride-grafted copolymer of ethylene/acrylic ester and their mixtures.

The preferred cross-linking agent in this alternative embodiment of the invention is a peroxide.

As in the case of the bead of heat-fusible adhesive (7) previously described, the adhesive mixture contained in the composition of the stopper plug contains between 5% and 40% by weight of acrylic ester of the total weight of the terpolymer or of the graft copolymer, between 0.3% and 5% by weight of maleic anhydride, of the total weight of the terpolymer or of the graft copolymer, the remainder being ethylene and preferably contains between 5% and 40% by weight of acrylic ester, of the total weight of the terpolymer or of the graft copolymer, between 0.3% and 5% by weight of maleic anhydride, of the total weight of the terpolymer or of the graft copolymer, the remainder being ethylene.

The expansion agent preferably used here is azodicarbonamide and constitutes between 0.1% and 30% by weight of the total weight of the composition of the stopper plug (7). More preferably the expansion agent constitutes between 1.5% and 5% by weight of the total weight of the stopper plug.

This means that the invention is not at all limited to the embodiments described and illustrated which have been given by way of example only.

We claim:

1. A plug for obturating an opening defined by an edge of a plate, the stopper plug comprising:

a surface having a dimension larger than the opening;

hooking lugs projecting from said surface for hooking said plug to the edge of the plate from inside the opening;

an annular groove between a free edge of the surface and the hooking lugs; and a bead of a heat-fusible adhesive embedded in said annular groove and comprising:
   (a) an adhesive mixture comprising a material selected from the group consisting of a terpolymer of ethylene/acrylic ester/maleic anhydride, a maleic anhydride-grafted copolymer of ethylene/acrylic ester, and combinations thereof,
   (b) a peroxide cross-linking agent,
   (c) an azodicarbonamide expansion agent decomposing at a temperature close to a cross-linking temperature of the adhesive mixture, and
   (d) additives for working purposes.

2. The plug according to claim 1, wherein the adhesive mixture comprises between 5% and 40% by weight of acrylic ester on the basis of the total weight of the terpolymer or grafted copolymer, between 0.3% and 5% by weight of maleic anhydride based on the total weight of the terpolymer or grafted copolymer, the balance of said adhesive mixture being ethylene.

3. The plug according to claim 1 wherein the terpolymer or maleic anhydride-grafted copolymer has a melt index between 2 and 400 g/10 mn.

4. The plug according to claim 1 wherein the expansion agent is between 0.1 and 30 weight % of the total weight of the bead of adhesive.

5. The plug according to claim 1 wherein the expansion agent is between 1.5% and 5% by weight of the total weight of the bead of adhesive.

6. A plug for obturating an opening defined by an edge of a plate, the plug comprising:

a surface comprising a dimension larger than a dimension of the opening;

hooking lugs projecting from said surface for hooking the plug to the edge of the plate from inside the opening;

an annular groove on said hooking lugs; and a bead of heat-fusible adhesive embedded in the annular groove and comprising:
   (a) an adhesive mixture,
   (b) a peroxide cross-linking agent,
   (c) an azodicarbonamide expansion agent decomposing at a temperature close to a cross-linking temperature of the adhesive mixture, and
   (d) additives for working purposes.

7. The plug according to claim 6 wherein the adhesive mixture comprises a material selected from the group consisting of a terpolymer of ethylene/acrylic ester/maleic anhydride, a maleic anhydride-grafted copolymer of ethylene/acrylic ester, and combinations thereof.

8. The plug according to claim 7 wherein the adhesive mixture comprises between 5% and 40% by weight of acrylic ester based on the total weight of the terpolymer or the grafted copolymer, between 0.3% and 5% by weight of maleic anhydride based on the total weight of the terpolymer or grafted copolymer, the balance of said adhesive mixture being ethylene.

9. The plug according to claim 7 wherein the terpolymer or maleic anhydride-grafted copolymer has a melt index between 2 and 400 g/10 mn.

10. A method of manufacturing a plug for obturating an opening defined by an edge of a plate, the method comprising:

injection molding a structure and a heat-fusible bead of adhesive in the same mold in two successive injections, wherein said injection molding of said bead of adhesive occurs at a temperature lower than a decomposition temperature of an expansion agent in said adhesive, and wherein the structure comprises: a surface comprising a dimension larger than a dimension of the opening, hooking lugs protecting from said surface for hooking the plug to the edge of the plate from inside the opening, and an annular groove on said hooking lugs; and wherein the bead of heat-fusible adhesive is embedded in the annular groove and comprises:
    (a) an adhesive mixture,
    (b) a peroxide cross-linking agent,
    (c) an azodicarbonamide expansion agent decomposing at a temperature close to a cross-linking temperature of the adhesive mixture, and
    (d) additives for working purposes.

11. The method of claim 10 comprising expanding said bead of adhesive after injection molding said bead of adhesive.

12. The method of claim 11 comprising cross-linking said bead of adhesive.

13. The method of claim 11 including expanding said bead of adhesive at between about 120 and about 200 degrees Celsius.

* * * * *

UNITED STATES PATENT AND TRADEMARK OFFICE
CERTIFICATE OF CORRECTION

PATENT NO.  : 5,852,854
DATED       : December 29, 1998
INVENTOR(S) : PIERROT et al.

It is certified that error appears in the above-identified patent and that said Letters Patent is hereby corrected as shown below: On the title page, Item 56: References Cited, insert the following:

4,480,054 10/1984 Enderle..........521/84.1;

4,247,652 1/1981 Matsuda et al......521/95;

Column 8, Line 41, change "protecting" to --projecting--.

Signed and Sealed this

Twentieth Day of July, 1999

Attest:

Q. TODD DICKINSON

Attesting Officer

Acting Commissioner of Patents and Trademarks